United States Patent [19]

Kropp et al.

[11] Patent Number: 5,507,907
[45] Date of Patent: Apr. 16, 1996

[54] BOX SEALING MACHINE WITH TAPE APPLICATOR SENSOR SYSTEM

[75] Inventors: Karl M. Kropp, Ramsey; Dale A. Johnson, Mound; Daniel D. Baker, St. Paul, all of Minn.

[73] Assignee: Minnesota Mining and Manufacturing Company, St. Paul, Minn.

[21] Appl. No.: 329,625

[22] Filed: Oct. 26, 1994

Related U.S. Application Data

[63] Continuation of Ser. No. 248,623, May 24, 1994, abandoned, which is a continuation of Ser. No. 123,873, Sep. 20, 1993, abandoned.

[51] Int. Cl.$^6$ .................................................. B32B 31/00
[52] U.S. Cl. ........................ 156/350; 156/351; 156/352; 156/368
[58] Field of Search ............................. 156/64, 350, 351, 156/352, 353, 360, 361, 362, 363, 366, 368; 53/137.1, 507, 508; 493/27

[56] References Cited

U.S. PATENT DOCUMENTS

| | | | |
|---|---|---|---|
| 3,767,513 | 10/1973 | Gnage et al. | 156/516 |
| 3,883,385 | 5/1975 | Kirk et al. | 156/352 |
| 3,915,786 | 10/1975 | Collett et al. | 156/355 |
| 3,925,139 | 12/1975 | Simmons | 156/358 |
| 3,984,276 | 10/1976 | Stuart | 156/366 |
| 3,989,574 | 11/1976 | Evans | 156/351 |
| 3,997,384 | 12/1976 | Kuring et al. | 156/269 |
| 4,052,240 | 10/1977 | Luhman et al. | 156/212 |
| 4,097,726 | 6/1978 | Satoh et al. | 235/92 MP |
| 4,166,399 | 9/1979 | Kiper et al. | 74/320 |
| 4,174,237 | 11/1979 | Hemming, Jr. et al. | 156/64 |
| 4,197,154 | 4/1980 | Pfaff, Jr. | 156/355 |
| 4,238,269 | 12/1980 | Deering, Jr. | 156/465 |
| 4,244,767 | 1/1981 | Hoeboer | 156/351 |
| 4,537,649 | 8/1985 | Ulrich et al. | 156/355 |
| 4,538,398 | 9/1985 | Marchetti | 53/493 |
| 4,548,022 | 10/1985 | Yaklia | 53/415 |
| 4,554,042 | 11/1985 | Marchetti | 156/350 |
| 4,581,876 | 4/1986 | Williams et al. | 53/484 |

(List continued on next page.)

FOREIGN PATENT DOCUMENTS

| | | | |
|---|---|---|---|
| 0287864A2 | 3/1988 | European Pat. Off. | G01P 13/00 |
| 4018834A1 | 1/1991 | Germany | G01P 13/00 |

OTHER PUBLICATIONS

Drawing entitled "Tape Sensor Kit–HST Head" No. 800111.
Drawing entitled "Low Tape/No Tape Sensor, 3M Matic" No. 800012.
Drawing entitled "Low Tape/No Tape Sensor Application" No. 800012–1.

*Primary Examiner*—David A. Simmons
*Assistant Examiner*—Paul M. Rivard
*Attorney, Agent, or Firm*—Gary L. Griswold; Walter N. Kirn; Mark W. Binder

[57] ABSTRACT

A sensor system for use with a taping head of a box sealing machine includes a tape dispensing sensor and an box presence sensor. The tape dispensing sensor is positioned along the tape guide path of the taping head for determining whether tape is being dispensed from the taping head and for providing a positive response if tape is being dispensed. The box presence sensor is positioned on the taping head for detecting movement of an element of the taping head that reacts to the box being moved along the taping head and for providing a positive response if a box is present. A control system is provided and is connected to the tape dispensing sensor and the object presence sensor for determining a potential error condition if only one of the tape dispensing sensor and the object presence sensor provides a positive response. Preferably, three sensors are utilized in the sensor system. One senses tape dispensing, another senses a box presence, and yet another senses tape supply left on the roll. Tape breakage, tape run-out and tape run-on error conditions are identified by this sensor system and produce electronic signals that control a fault signalling device, such as a warning light, and also preferably control the main power to the box sealing machine.

17 Claims, 13 Drawing Sheets

U.S. PATENT DOCUMENTS

| | | | |
|---|---|---|---|
| 4,585,504 | 4/1986 | Marchetti | 156/351 |
| 4,592,188 | 6/1986 | Marchetti | 53/137 |
| 4,640,731 | 2/1987 | Lerner et al. | 156/355 |
| 4,642,157 | 2/1987 | Cavanagh | 156/468 |
| 4,687,535 | 8/1987 | Voltmer | 156/361 |
| 4,738,075 | 4/1988 | Marchetti | 53/137 |
| 4,781,786 | 11/1988 | Lerner et al. | 156/468 |
| 4,789,418 | 12/1988 | Rayl | 156/468 |
| 4,792,392 | 12/1988 | Belgian | 209/3.3 |
| 4,836,873 | 6/1989 | Mitanihara et al. | 156/157 |
| 4,846,921 | 7/1989 | Lerner et al. | 156/352 |
| 4,855,006 | 8/1989 | Marchetti | 156/486 |
| 4,889,581 | 12/1989 | Ulrich et al. | 156/443 |
| 4,921,566 | 5/1990 | Stork | 156/354 |
| 4,927,486 | 5/1990 | Fattal et al. | 156/351 |
| 4,961,814 | 10/1990 | Arnold | 156/446 |
| 4,989,651 | 2/1991 | Snellgrove | 144/3 R |
| 5,062,251 | 11/1991 | Gunther | 53/134.1 |
| 5,080,748 | 1/1992 | Bonomi | 156/364 |
| 5,094,710 | 3/1992 | Sokolovsky | 156/463 |

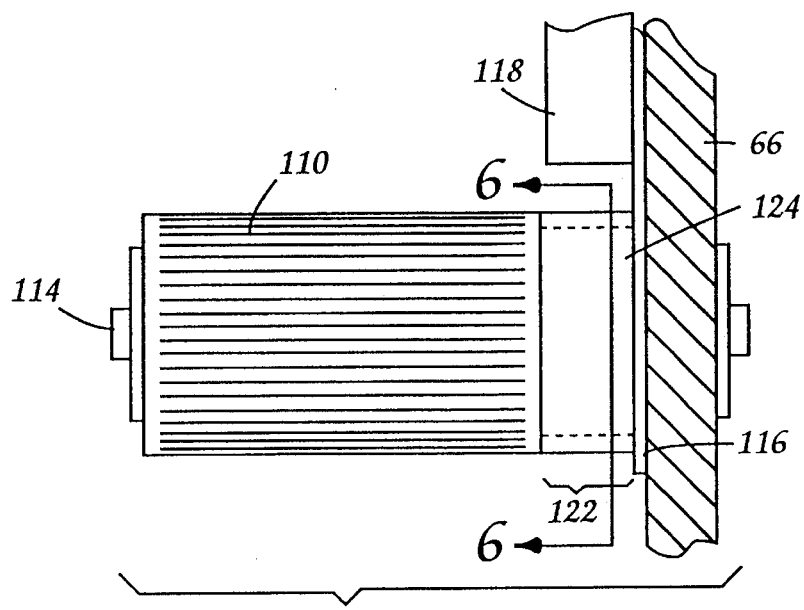
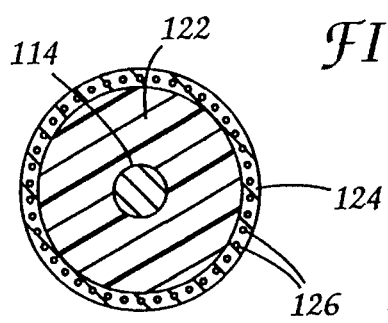
*FIG.5*
*FIG.6*
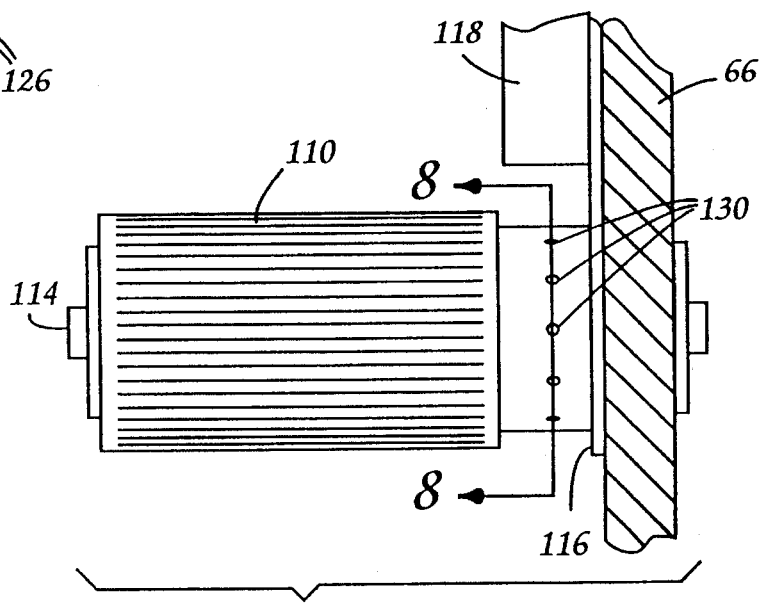
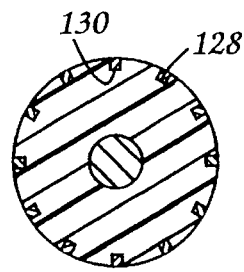
*FIG.7*
*FIG.8*

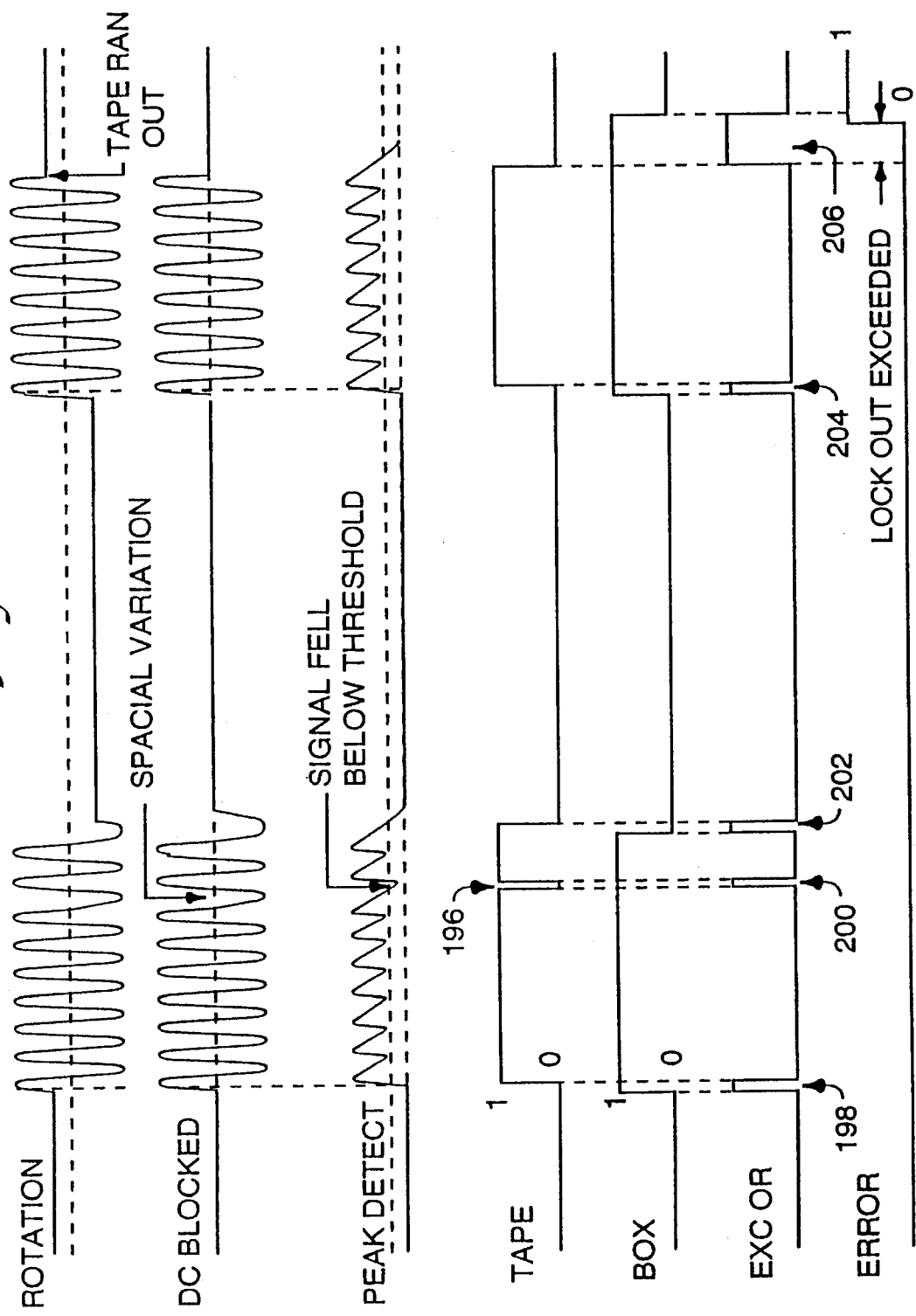

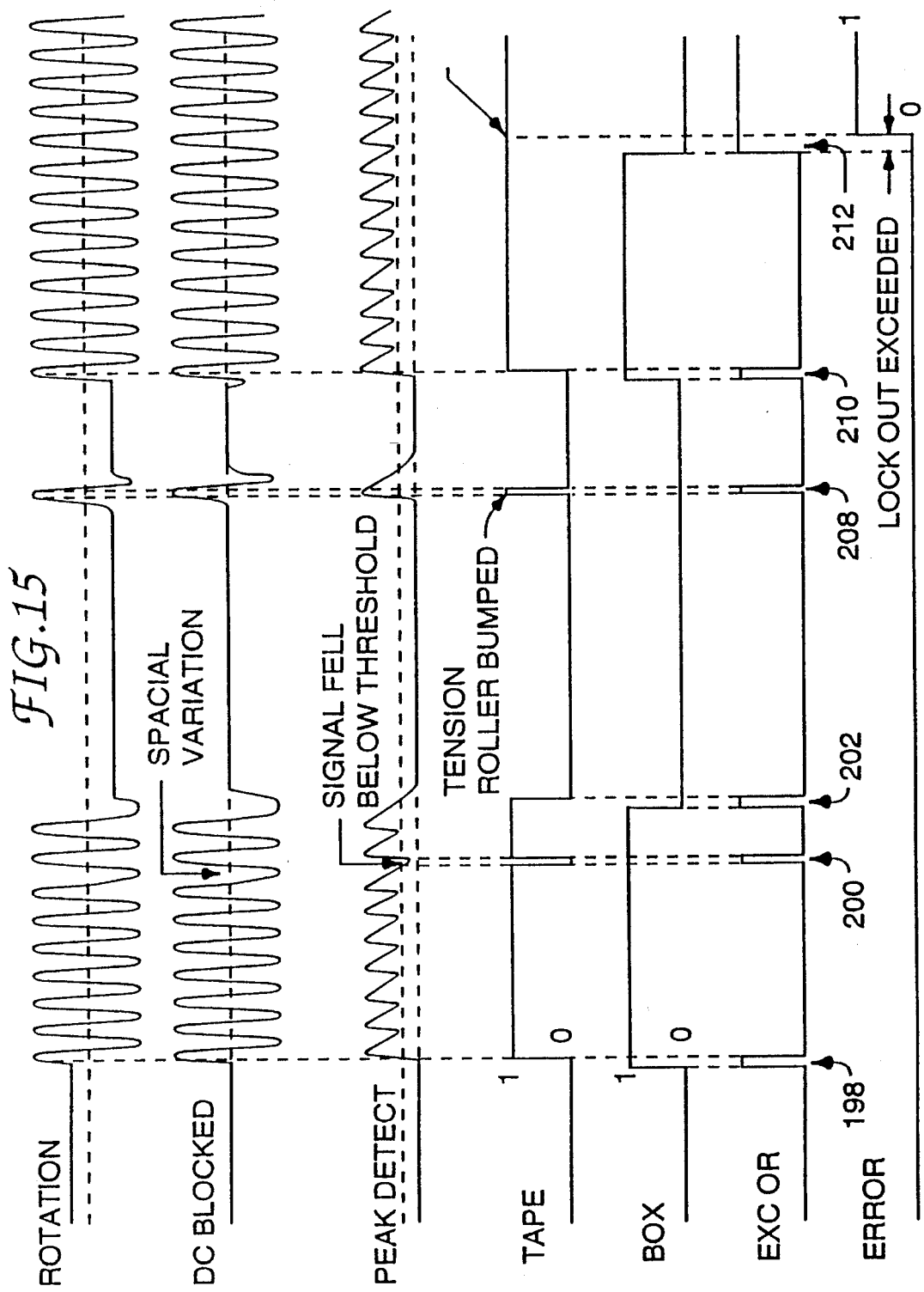

BOX SEALING MACHINE WITH TAPE APPLICATOR SENSOR SYSTEM

This is a continuation of application Ser. No. 08/248,623 filed May 24, 1994 now abandoned, which is a continuation of Ser. No. 08/123,873, filed Sept. 20, 1993, now abandoned.

TECHNICAL FIELD

The present invention relates to a sensor system which monitors the tape application of box sealing machines to boxes. More specifically, the present invention detects and identifies a variety of error conditions which may occur on box sealing machines. Moreover, output from the sensor system can be used to control the box sealing operation.

BACKGROUND

The use of pressure-sensitive adhesive tape for the purpose of sealing boxes, and more specifically box flaps, is generally known. Moreover, it is known that cartons or boxes which are continuously moved along a conveyor can be automatically sealed by such adhesive tape.

Box sealing machines have been developed for applying lengths of tape to boxes as they are moved through such machines in a continuous manner. Moreover, such box sealing machines are known to be provided as part of a packaging line where the boxes are fed continuously to the box sealing machine from which the sealed boxes are further conveyed for further processing, such as palletizing, shipping, etc. Boxes are typically sealed on one or more sides, and such box sealing machines typically provide taping heads of a number corresponding to the number of box sides to be sealed. The taping heads may be arranged to seal the top and bottom box flaps, opposite side flaps, or any combination thereof.

Such box sealing machines, like any other machine within the packaging line, when down, have the potential to slow down or even stop the entire packaging line. Thus, it is beneficial to minimize such down time. Unless the adhesive tape is supplied to the box sealing machine by a continuous tape supply, that is of indefinite length, the box sealing machine will need to be stopped on a regular basis to change tape rolls. Minimizing other down time is highly desirable.

It is not only important to minimize machine down time, it is also important to minimize improper taping and sealing of boxes. Further in this regard, it is desirable to detect any improper taping or other errors within the packaging line so that it can be corrected as soon as possible. Of course, the longer that it takes to detect such error, the more boxes that are improperly sealed and which must be redone.

The monitoring of equipment in general as well as the monitoring of product exiting any production line for quality purposes is well known. Such monitoring includes the use of a wide variety of inspection systems which rely on many different kinds of sensors depending on the object being monitored. Typical sensors include cameras, optical sensors, mechanical sensors, magnetic sensors, electrical sensors, and the like, which are typically provided as part of a controlled system which includes a feedback loop or circuit which may control such processing equipment. Moreover, it is generally known that if certain errors are detected, machines may be actually shut down until a correction is made. Examples of labeling machines having sensing systems which disable certain machine functions upon the detection of a missing label are described in U.S. Pat. No. 4,687,535 to Voltmer and U.S. Pat. No. 3,989,574 to Evans.

With regard to box sealing machines, it is well known to use a variety of sensors, such as mechanical switches, optical sensors, photo cells, electrical switches, and the like to control the taping operation of a box driven through such machine. Typically, such sensors detect the position of the box as it is moved through the machine and controls specific taping operations based on the detected box position. Examples of such taping machines including control sensors can be found in U.S. Pat. Nos. 4,846,921 to Lerner et al., 4,836,873 to Mitanihara et al., U.S. Pat. No. 4,640,731 to Lerner et al., U.S. Pat. Nos. 4,585,504, 4,554,042 and 4,538,398 to Marchetti, and U.S. Pat. No. 4,548,022 to Yaklia. The sensing systems of these machines, however, are not provided with the sensing error conditions. Moreover, they do not provide a feedback for disabling any function of the machines.

One such box sealing machine which includes a sensor for detecting an error condition is that described in U.S. Pat. No. 4,855,006 to Marchetti. In this machine, a control system is provided to sense the tape feed so that it is possible to stop the machine if the tape feed ceases. More specifically, the control system is a pneumatic system comprising a pneumatic valve which is responsive to a cam which is rotated by the tape as it is applied. The valve further controls a timer which generates a warning signal for each occasion in which the time interval is longer than a predetermined limit. Additionally, the taping head includes a second pneumatic valve which activates the system upon the presence of a box within the machine at the point of the taping head. Thus, when a box is present, and if the application of tape is not sensed by the first sensor, an error condition is detected and a warning is made which may include machine stoppage. Lastly, a third pneumatic valve sensor is provided which detects when a supplied tape roll is nearly depleted. The pneumatic sensing system of the Marchetti device is limited in that it senses or detects an error to occur only when a box is present and tape is not dispensed. It would not sense other potential error conditions, such as may occur when tape is being dispensed while a box is no longer present, which may occur by a failure to cut an applied length of tape.

SUMMARY OF THE INVENTION

In general, the present invention comprises a sensor system for detecting operating conditions of a box sealing machine for monitoring machine performance. More specifically, a more comprehensive set of error conditions can be detected by the subject sensor system. The sensor system includes a control means which can be used to provide a warning of certain error conditions and/or can turn off the box sealing machine or an associated machine. Moreover, it is possible to directly interface the control means to a programmable logic controller input for line control or computer input for quality control monitoring. The sensor system can be provided as a part of newly manufactured box sealing machines, or the system is retrofitable on a variety of existing box sealing machines.

The sensor system is advantageous over the prior art box sealing machines incorporating sensors in that it detects errors which would otherwise be undetected until noticed by an operator, which may require the correction of a number of improperly sealed boxes. The sensor system of the present invention will advantageously reduce down time in production environments by identifying low tape supply conditions, flagging tape run out or tape breakage situations, and determining tape run on conditions which can be caused by the failure of the tape to be cut at the end of a box sealing cycle. Moreover, the sensor system of the present invention detects the situations discussed just previously and is embodied in one unit with hierarchy discrimination between a low tape situation and tape breakage, no tape and tape run-on situations for one or two taping heads of a box sealing machine. Furthermore, the sensor system permits the detection of box sealing tape application to boxes in real time.

The above advantages are achieved by a sensor system for use with a taping head that includes a tape guide path defined through the taping head and an element which moves in reaction to an object, such as a box, that is moved relative to the taping head comprising a tape dispensing sensor and an object presence sensor. The tape dispensing sensor is to be positioned along the tape guide path of the taping head for determining whether tape is being dispensed from the taping head and for providing a positive response if tape is being dispensed. The object presence sensor is to be positioned on the taping head for detecting movement of an element of the taping head that reacts to the object being moved along the taping head and for determining whether the object is present for taping and for providing a positive response if an object is present. A control system is provided and is connected to the tape dispensing sensor and the object presence sensor for determining a potential error condition if only one of the tape dispensing sensor and the object presence sensor provides a positive response.

Preferably, three sensors are utilized in the sensor system. One senses tape dispensing, another senses a box presence, and yet another senses tape supply left on the roll. The first two sensors are attachable directly to the taping heads of the box sealing machines, and once properly installed, require no further adjustments. The third sensor is preferably attached to a bracket such that it can be positioned by the user to detect low tape supply. The user can adjust the low tape sensor to provide a low tape warning in accordance with their specific tape usage rate and desired response time to change tape supply rolls. Tape breakage, tape run-out or tape run-on error conditions which are identified by this device produce electronic signals that control a fault signalling device, such as a warning light, and also preferably control the main power to the box sealing machine.

In another aspect of the present invention, a relatively simple magnetic sensor system is provided for monitoring the rotation of a single roller. The magnetic sensor system advantageously comprises the use of a piece of flexible permanent magnetic material made from a flexible material having substantially linear magnetic poles arranged at closely spaced regular intervals. The flexible material is preferably provided about a hub portion of such a roller to be monitored with the magnetic poles extending in the axial direction of the roller. Thus, the magnetic poles provide a series of magnetic fields surrounding the hub portion, which when sensed by a conventional magnetic sensor, such as a Hall effect sensor, generate pulses in accordance with the detected field. The poles may be of alternating polarity, which produce alternating positive and negative pulses. Moreover, the number of magnetic poles per the circumference of the hub defines the resolution of the signal provided from the sensor and with the speed of rotation defines the frequency of the signal.

BRIEF DESCRIPTION OF THE DRAWINGS

FIG. 5 is a side view of the tension roller of the taping head of FIGS. 3 and 4 with a first arrangement of magnetic material provided as a layer around a hub portion of the roller for providing plural magnetic fields about the circumference of the hub portion to be sensed by a tape dispensing sensor;

FIG. 6 is a cross-sectional view taken along line 6—6 in FIG. 5 showing the magnetic poles that form the plurality of separate magnetic poles on the surface of the layer of magnetic material;

FIG. 7 is a view similar to FIG. 5 of the tension roller but with an alternative manner of mounting magnetic material to the hub portion of the tension roller using a plurality of evenly spaced individual magnets arranged about the circumference of the hub portion;

FIG. 8 is a similar cross-sectional view as FIG. 6 but of the magnet arrangement of FIG. 7;

FIG. 14 is a wave chart showing the signals from the tape dispensing sensor and the box presence sensor and the detection of possible error conditions and an actual error condition caused by a tape run-out or breakage condition;

FIG. 15 is a wave chart showing the signals from the tape dispensing sensor and the box presence sensor and the detection of possible error conditions and an actual error condition caused by a failure of the tape to be cut after a box has been sealed;

DETAILED DESCRIPTION

Figure 1:
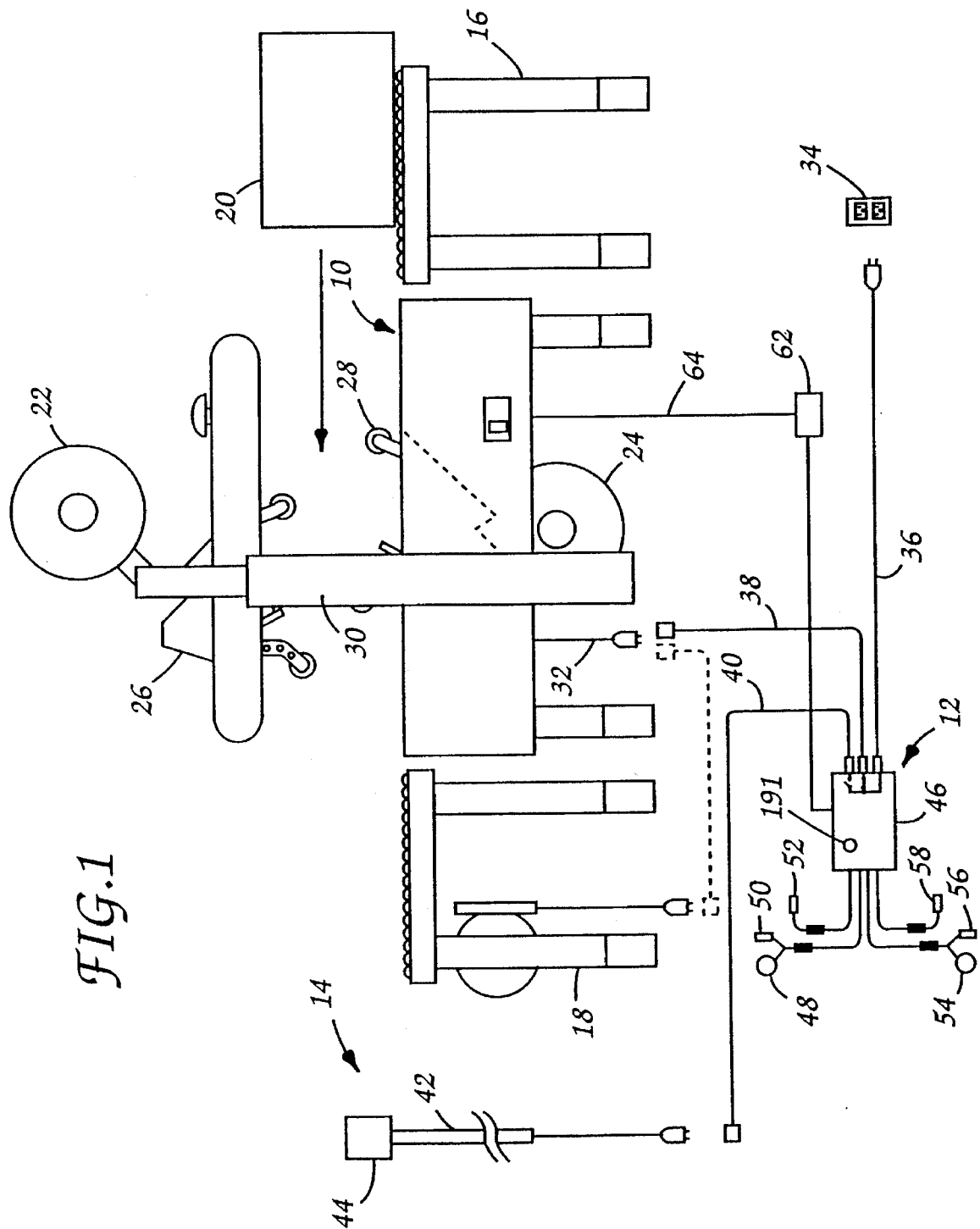
FIG. 1 is a schematic drawing of a box sealing machine combined with a warning device and a sensor system in accordance with the present invention.
Figure 2:
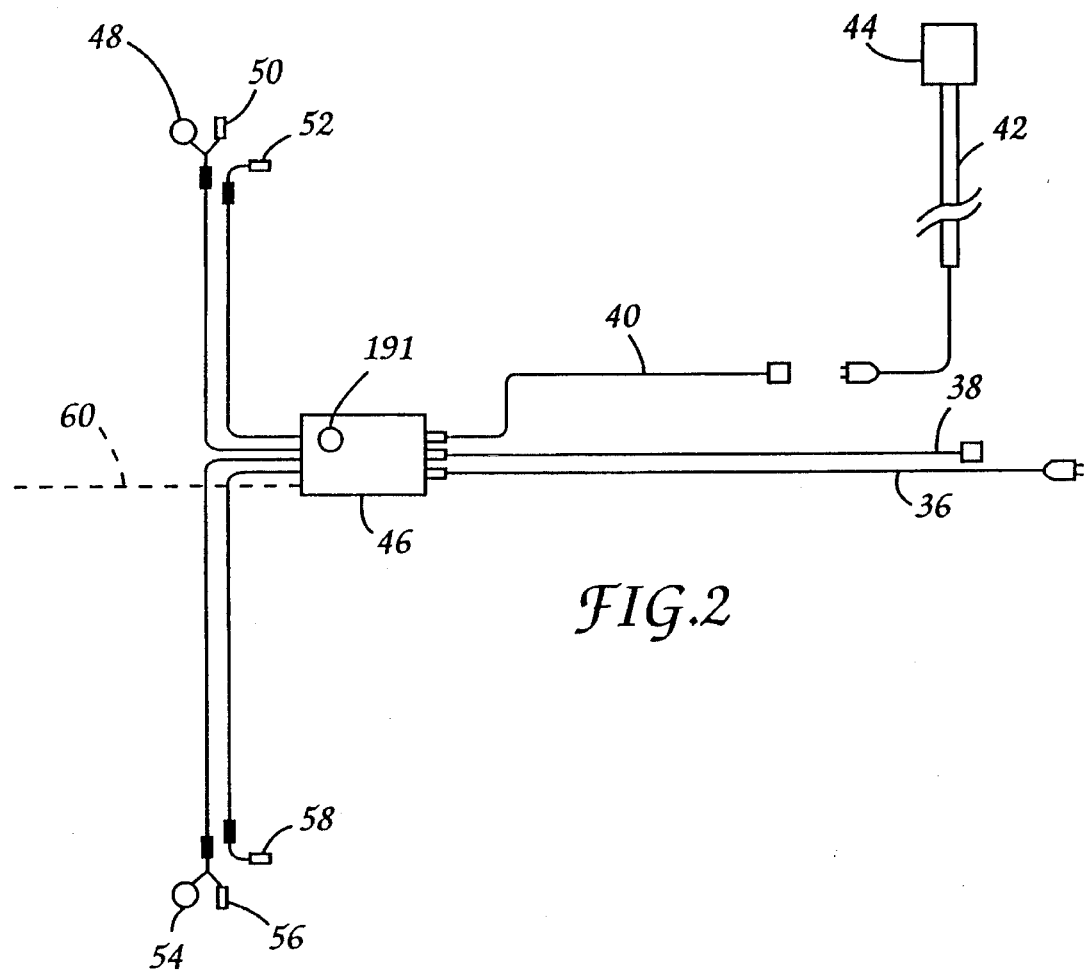
FIG. 2 is a schematic drawing of the sensor system, the warning device, and upper and lower taping heads of a box sealing machine.

With reference to the drawings, wherein like numerals are used to designate like components throughout the several figures, and initially to FIG. 1, a box sealing machine 10 is schematically illustrated and is connected with a sensor system 12 and a warning device 14. An entrance conveyor 16 and an exit conveyor 18 are also shown which together with the box sealing machine 10 define the path over which a box 20 is directed for sealing the box flaps with pressure sensitive adhesive box sealing tape supplied from upper and lower tape rolls 22 and 24, respectively. The illustrated box sealing machine 10 includes an upper taping head 26 and a lower taping head 28 for providing tape to both the upper and lower surfaces of the box 20 as it is driven through the box sealing machine 10. However, it is understood that the subject invention is just as applicable to box sealing machines that have but a single taping head, or to those which include one or more taping heads arranged differently. For example, one or more sides of the box 20 can be sealed instead of the top and bottom flaps. The upper taping head 26 is preferably adjustably mounted to the base of the box sealing machine 10 by a pair of adjustable columns 30, which are conventionally known, and which permit the box sealing machine 10 to accommodate a wide variety of box sizes.

Power is supplied to the box sealing machine 10 typically by a power cord 32, and typical box sealing machines require AC line voltage of 115 v or 230 v. The sensor system 12, however, is preferably connected between the power input cord 32 of the box sealing machine 10 and the AC power source indicated as 34. The sensor system 12 acts as a switching mechanism which can break power from its input line 36 to its switched power output line 38 depending on whether or not an error condition is sensed that requires a load such as the box sealing machine 10 to be switched off. The power cord 32 of the box sealing machine 10 is then appropriately connected with the switched power output line 38 from the sensor system 12.

Another switched power output line 40 extends from the sensor system 12, but is controlled by a different switching mechanism than that of the switched power output line 38. The output line 40 is preferably connected to the warning device 14 for powering it again in accordance with specific error conditions. The relationship between the warning device 14 and the switching of power to the box sealing machine 10 will be more apparent from the description of the control circuit below. Preferably, the warning device 14 comprises a light pole 42 having a warning light 44 mounted thereon and which is lighted to signal a machine error condition or other warning. The warning light 44 may simply come on to signify such a warning, or may flash in any number of specific patterns.

The sensor system 12 of the present invention preferably comprises a control box 46 connected with a plurality of sensors for each taping head provided within the box sealing machine 10. Specifically, for the illustrated box sealing machine 10 having an upper and a lower taping head, the sensor group corresponding to the upper taping head 26 preferably comprises a tape dispensing sensor 48, a box presence sensor 50 and a low tape supply sensor 52. Likewise, the sensor group for the lower taping head 28 preferably comprises a tape dispensing sensor 54, a box presence sensor 56 and a low tape supply sensor 58. The control box 46 also preferably includes a signal output line 60 which provides an interface for the user to integrate the sensor system 12 into their own controlling or monitoring system of an entire packaging or production line, such as may include a programmable logic controller, as illustrated by box 62 in FIG. 1. Such a programmable logic controller 62 can also be used to control the box sealing machine 10 operations by a line 64, schematically illustrated in FIG. 1. It is also contemplated that the signal output line 60, which can provide a signal designating specific error conditions, as will be further explained below, can be used for controlling many other production or packaging line operations, or to simply provide further indications to the user's control system.

Figure 3:
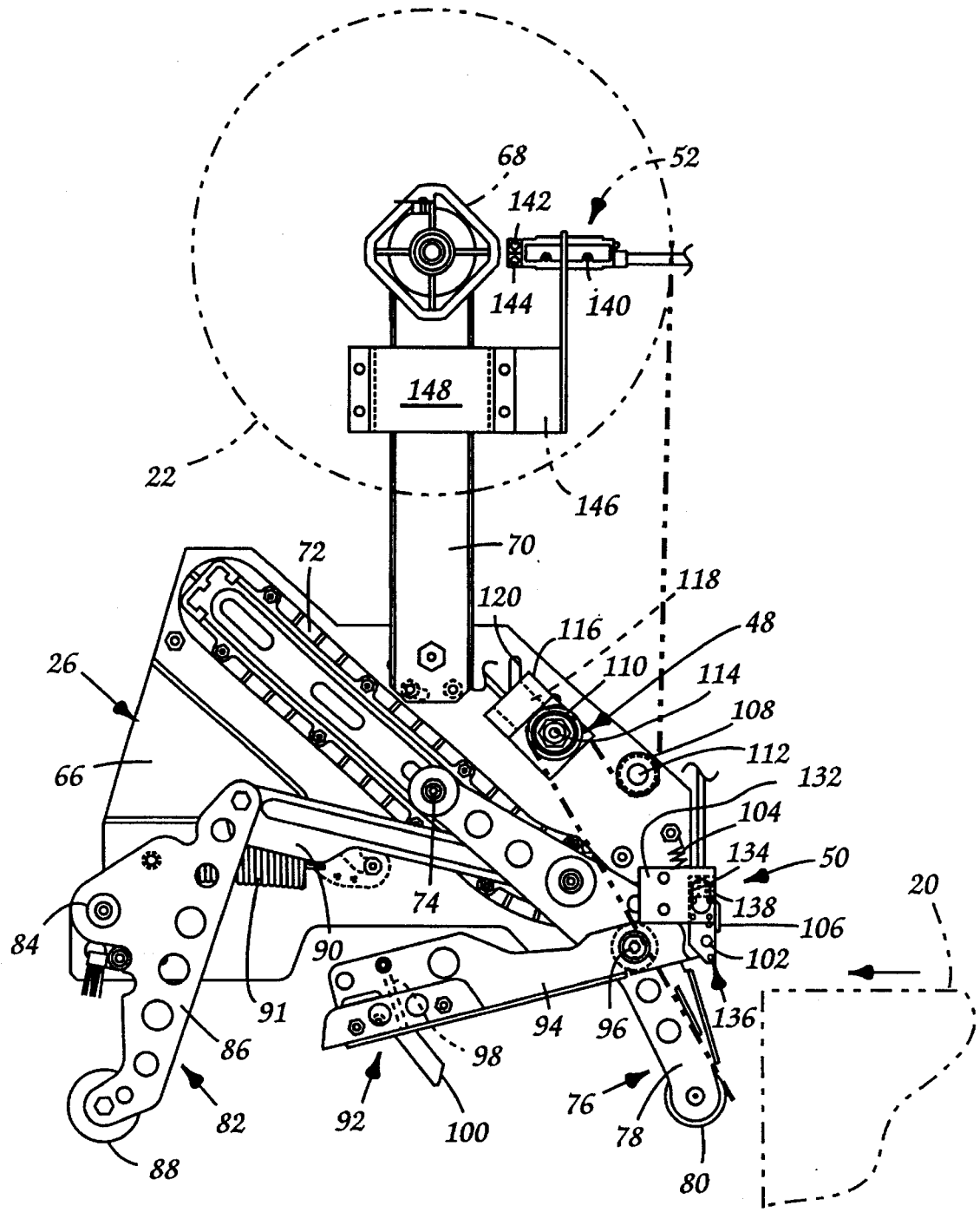
FIG. 3 is a side view of a taping head with one of its side plates removed showing the position of the taping head components before it is encountered by the leading surface of an approaching box, and with a box presence sensor in a first position.
Figure 4:
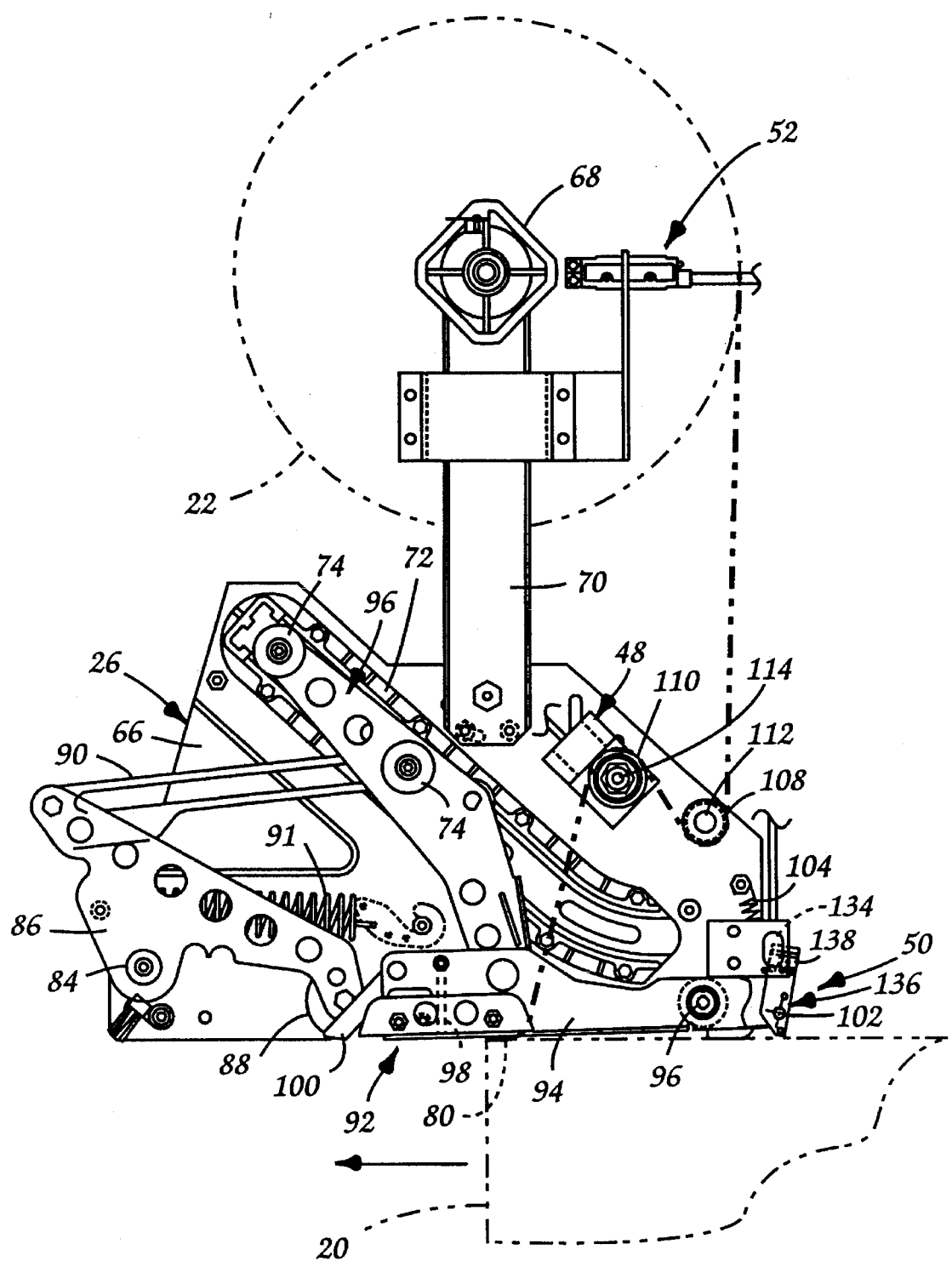
FIG. 4 is a view of the taping head of FIG. 3 after the box has been advanced sufficiently to retract the application roller and the cutting frame of the taping head and with the box presence sensor in a second position in which it detects that the box is present.

With reference now to FIGS. 3 and 4, the upper taping head 26 will be more fully described and the specific positioning of the sensors 48, 50 and 52, with the understanding that the same description applies to the lower taping head 28 with its sensor group comprising sensors 54, 56 and 58. The taping head 26 that is illustrated in FIGS. 3 and 4 comprises a standard taping head available from Minnesota Mining and Manufacturing Company of St. Paul Minn., and is sold as an AccuGlide™ II taping head. It is understood that the sensor system 12 of the present invention can be likewise provided on many other taping heads including the AccuGlide™ and the HST taping heads also available from Minnesota Mining and Manufacturing Company.

The taping head 26 comprises a pair of spaced frame plates 66, only one of which is shown and the other of which is removed in the Figures to illustrate the other components of the taping head clearly. A tape roll support hub 68 is shown rotatably freely mounted to a support arm 70 which is fixed with the side frame plate 66, and is used for supporting the upper tape roll 22. The support arm 70 can alternatively be mounted to a structural element of the box sealing machine 10. The opposed inside surfaces of each of the side frame plates (only one of which is shown at 66) is provided with a guide track 72 which receives a pair of rollers 74 of a first applying arm assembly 76. The first applying arm assembly 76 comprises a pair of spaced arms 78 (again only one shown) which are maintained spaced from one another by spacer elements (not shown), and which further support an application roller 80 for applying the tape from roll 22 to the box 20. The guide tracks 72 define the path of movement of the first applying arm 76 from its position shown in FIG. 3 to its retracted position shown in FIG. 4.

A buffing arm assembly 82 is rotatably freely supported between the side frame plates 66 on a pivot shaft 84. Again, the buffing arm assembly 82 preferably comprises a pair of spaced arms 86 (only one shown) which are held in spaced positions to one another by appropriate spacers, and which support a buffing roller 88. Between an end of at least one of the arms 86 that is on the opposite side of pivot shaft 84 from the buffing roller 88 and an intermediate point on the first apply arm assembly 76, preferably at the point of connection of the lower of the two rollers 74, is a link 90. Link 90 controls that pivotal movement of the buffing arm assembly 82 as the first applying arm assembly 76 moves from its extended position to its retracted position as illustrated in FIGS. 3 and 4. A tension spring 91 is also preferably mounted between one of the spaced arms 86 and the side frame plate 66 so as to bias the buffing arm assembly 82 and the first applying arm assembly 76, via link 90, toward their extended positions, shown in FIG. 3.

Also pivotally mounted to the side frame plates 66 is a cutting frame 92 which comprises a pair of spaced arms 94 (only one shown) which are maintained spaced from one another. The spaced arms 94 are rotatably freely connected to the side frame plates 66 by pivot pins 96. The first applying arm assembly 76 is located between the spaced arms 94 of the cutting frame 92 so as not to interfere with each others operations. The cutting frame 92 also includes a blade 98 and a pivotal blade guard 100 which is preferably spring biased (not shown) to cover the cutting edge of the blade 98 when in the FIG. 3 position. At the opposite end of the cutting frame 92 on the other side of the pivot pins 96 from the blade 98, a spacer shaft 102 is provided connected between the spaced arms 94. As shown in FIGS. 3 and 4, the end portion of the arm 94 that is closest in the view has been broken away to reveal the spacer shaft 102 and to illustrate the location of the box presence sensor 50, explained in further detail below. A tension spring 104 is used to bias the cutting frame 92 to its extended position, shown in FIG. 3, with the blade end thereof below the side frame of plates 66, and with the spacer shaft 102 in its uppermost position. This uppermost position is defined by a stop tab 106 of at least one of the side frame plates 66 which engages with the end of the spacer shaft 102.

Also supported from the side frame plate 66 is a wrap roller 108 and a tension roller 110 which together with the application roller 80 define the tape path for the tape 22 through the taping held 26. The wrap roller 108 is freely rotatably mounted on a shaft 112, and the tension roller 110 is also freely rotatably mounted on a shaft 114. The shaft 114 of the tension roller 110 is also preferably mounted within a slot (not shown) that extends vertically through the side frame plate 66 to thereby permit the adjustable positioning of the tension roller 110 on the side frame plate 66. This adjustability affects and in part determines the coincidence timing between tape dispensing and box presence, as will be discussed below.

As also shown in FIGS. 3 and 4, the tape dispensing sensor 48, the box presence sensor 50 and the low tape supply sensor 52 are illustrated positioned on the taping head 26. The lower group of sensors comprising the tape dispensing sensor 54, the box presence sensor 56 and the low tape supply sensor 58 would be similarly positioned on the lower taping head 28.

The tape dispensing sensor 48 preferably comprises a sensor mounting bracket 116 and a magnetic sensor known as a Hall effect sensor 118 mounted within the sensor mounting bracket 116. More preferably, the sensor 118 comprises an analog Hall effect sensor, such as that available from the Micro Switch Division of Honeywell Corporation of Minneapolis, Minn. as part no. 91SS12—2, for example. It is understood that other types of sensors or a digital Hall effect sensor could be used. The sensor mounting bracket 116 is preferably mounted to the shaft 114 of the tension roller 110 and is preferably further mounted within a slot 120 through side frame plate 66 so that the sensor 118 and sensor mounting bracket 116 are adjustably mounted to the side frame plate 66 along with the tension roller 110.

As shown in FIGS. 5 and 6, the tension roller 110 includes a hub portion 122 located adjacent to side frame plate 66, and more specifically just adjacent to a side surface of the sensor mounting bracket 116. On this hub portion 122, a plurality of magnetic poles are defined along the circumference of the surface. In accordance with one embodiment, these magnetic poles are provided by a layer of flexible permanent magnetic material which is commercially available from The Arnold Engineering Company of Norfolk, NE, and known as Plastiform™ flexible permanent magnetic material. Such flexible magnetic material comprises a flexible sheet with a plurality of substantially linear magnetic poles arranged at its surface.

In accordance with the present invention, the layer of flexible magnetic material 124 preferably covers substantially the entire circumference of the hub portion 122 and is arranged such that the magnetic poles 126 on the surface of the flexible layer 124 extend in the axial direction of the tension roller 110 and its shaft 114. In FIG. 6, the poles are illustrated within the layer of flexible magnetic material as strand-like for the purpose of explanation, but it is understood that what is necessary is magnetic poles at the material surface. Thus, a plurality of magnetic poles are formed about the circumference of the hub portion 122. The layer of magnetic material can be fixed with the hub portion 122 by any conventional manner including adhesives, tapes, a shrink band of polymeric material, or other mechanical connection. Typically, the flexible magnetic material, as commercially available, is provided with alternating magnetic poles making up the magnetic poles 126. It is, however, contemplated that such flexible magnetic material may include all poles of a similar magnetic polarity. In any case, the analog Hall effect sensor 118 can sense the passing of each pole, and can convert the sensed magnetic fields to either positive or negative pulses of its output signal, as will be further described below.

As an alternative manner of providing the magnetic poles about the hub portion 122 of the tension roller 120, individual magnets can be located on the hub portion 122 about the circumference thereof, as illustrated in FIGS. 7 and 8. Specifically, a number of bores 128 are provided through the surface of the hub portion 122 into which magnets 130 are inserted. The magnets 130 may be held within the bores 128 frictionally, or by the addition of adhesive, or the like. The magnets 130 should be regularly spaced about the circumference and positioned axially along the hub portion to pass in front of the analog Hall effect sensor 118 as the tension roller 110 rotates. Again, the magnets can be arranged such that each pole is similar, or they may be alternatingly provided. Since individual magnets are used and it is economically constraining to use as many as are provided by the flexible magnetic material 124, less magnetic poles would be typically provided, and it is preferable that each of the poles be of similar polarity for the reasons discussed below. Further in this regard, it is understood that the number of poles increases the resolution of the signal provided from the analog Hall effect sensor 118. Moreover, it is understood that the distance between the analog Hall effect sensor 118 and the magnets is important in providing an adequate signal from the analog Hall effect sensor 118. Specifically, the closer the sensor to the magnets, the stronger the signal voltage. Preferably, the analog Hall effect sensor 118 should be located within 100 mils of the magnets. In any case, an AC signal is outputted from the analog Hall effect sensor 118 in response to the changing magnetic fields as the tension roller 110 is rotated. Any DC signal will be ignored, as described below, as may occur when the sensor 118 senses that the tension roller 110 is not moving.

The box presence sensor 50 comprises a sensor mounting bracket 132 and another magnetic sensor, preferably comprising a Hall effect sensor 134. More preferably, the Hall effect sensor 134 comprises a digital Hall effect sensor for reasons discussed below, such as that commercially available from the Mirco Switch Division of Honeywell Corporation of Minneapolis Minn. as part no. SS441A. As shown in FIGS. 3 and 4, the sensor mounting bracket 132 is positioned to be mounted on the inside face of the side frame plate 66 that is not shown.

A magnet holding bracket 136 is mounted non-rotationally to the spacer shaft 102 so as to extend such that it can position a magnet 138 adjacent to the digital Hall effect sensor 134. More specifically, the sensor mounting bracket 132 and the magnet holding bracket 136 are positioned and dimensioned such that when the cutting frame 92 is in its lower position, illustrated in FIG. 3, the magnet 138 is positioned directly in front of the digital Hall effect sensor 134. On the other hand, when the cutting frame 92 is retracted within the side frame plates 66, the magnet holding bracket 136 is rotated with the spacer shaft 102 such that the magnet is moved away from the digital Hall effect sensor 134. The point in time at which the magnet 138 is no longer sensed by the sensor 134 is preferably as close as possible to the initiation of tape dispensing, which is controlled by the position that the magnet 138 is located on the bracket 136. Thus, it can be seen that when the cutting frame 92 is in its extended position, when no box is present, that the digital Hall effect sensor 134 detects a no-box presence condition. When the box forces the retraction of the cutting frame 92, the digital Hall effect sensor 134 detects the box presence. A digital signal is thus provided from the digital Hall effect sensor 134 indicating either a no presence or a presence condition, which will be further described below.

The low tape supply sensor 52 preferably comprises an optical diffuse sensor 140 such as commonly available from Eaton Incorporated of Everett, Wash. as Opcon part no. 13106RF1017. It is understood that many types of sensors could be used instead of an optical sensor, or a wide variety of optical sensors could be utilized. A typical optical sensor 140 comprises a light source 142 and a light detector 144 which senses light reflection off the object when a surface thereof is in front of the light source and the light detector. In accordance with the present invention, the optical sensor 140 reads off of the side of the tape roll 22 and indicates when the tape is no longer in front of its optical sensor 144. Preferably, the optical sensor 140 is mounted to a bracket 146 which is adjustably mounted to the support arm 70 for the tape roll support hub 68. This adjustment can be done in any number ways as long as the optical sensor 140 can be positioned from a position adjacent to the tape roll core out to some distance there from which is adequate to cover when a specific user would like to be warned of a low tape supply situation. As illustrated, the bracket 146 includes a shoe bracket 148 which is bolted there too to sandwich and frictionally hold onto the support arm 70. The optical sensor 140 is thus easily adjustable from a position adjacent the tape core all the way out to its outer most layer of tape.

Figure 9:
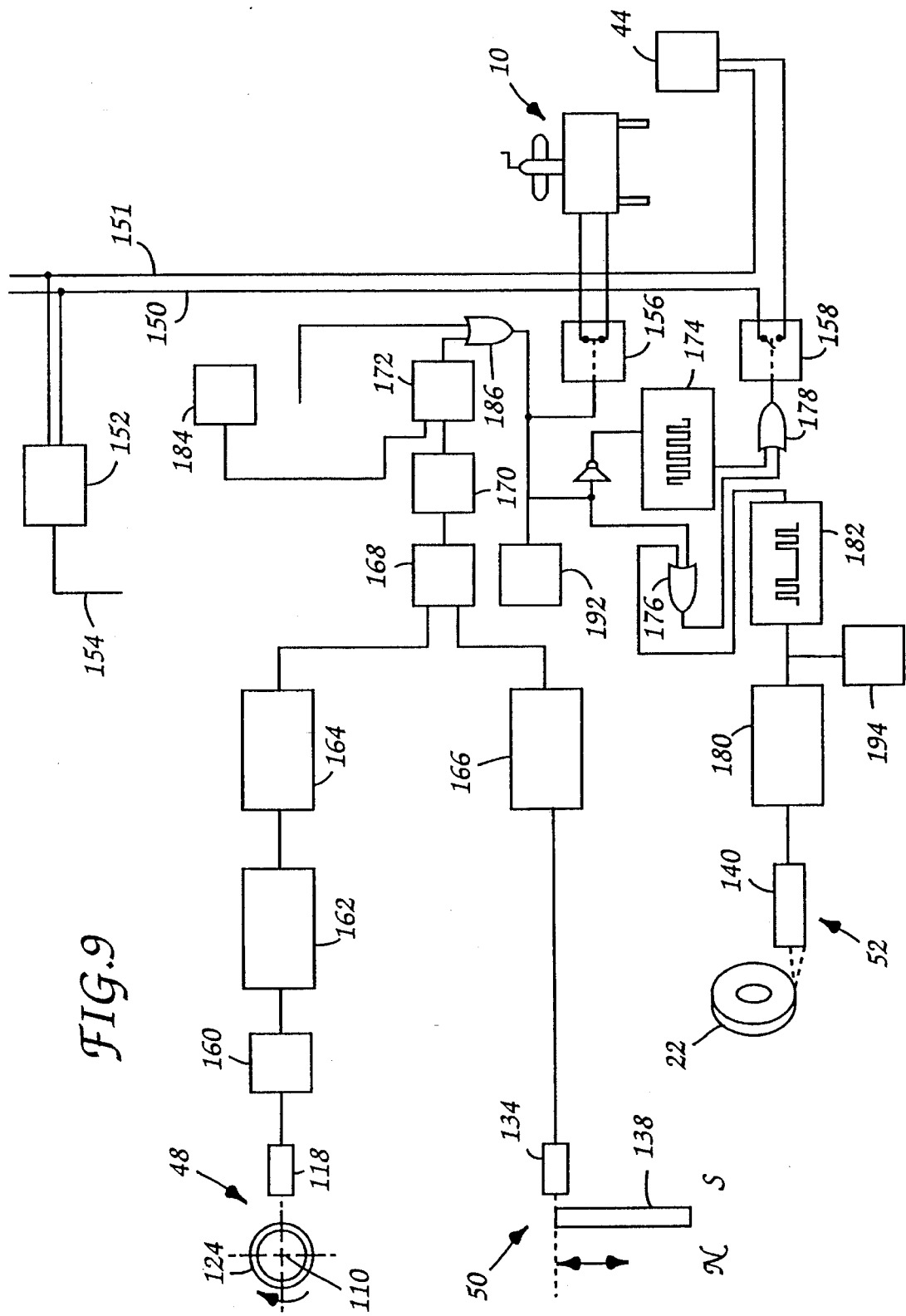
FIG. 9 is a block schematic diagram of the sensor system of the present invention for detecting error conditions and activating a warning device and for controlling box sealing machine operation.

With reference to the block diagram shown in FIG. 9, the control system of the subject sensor system 12 is provided connected between the tape dispensing sensor 48, the box presence sensor 50, the low tape supply sensor 52, a load comprising the box sealing machine 10 and a warning device 14. AC line voltage is inputted into the system, and specifically the box sealing machine 10 and the warning light 44 by power lines 150 and 151, and power is supplied to the sensors and the logic circuit by a bipolar power supply 152. In this regard, the AC line voltage is preferably 115 v or 230 v, and the bipolar power supply preferably provides the requisite positive and negative voltages needed for the sensors and the logic circuit. It is understood that the different sensors may have different power requirements which may yet be different from the power requirement of the logic circuit. A power line 154 is illustrated coming from the bipolar power supply 152 which is meant to schematically illustrate the power input to each of the sensors and the logic circuit.

As described earlier, the AC line voltage passes through respective switches before being connected to the box sealing machine 10 or the warning light 44. At the box sealing machine 10, an interface 156 is provided breaking power line 150 of the AC line voltage, and a second interface 158 is provided to break AC line 150 before the warning light 44. The switches within the interfaces 156 and 158, respectively, are controlled by signals provided to the interface units from the control circuit from the combination of the sensors 48, 50 and 52 as determined by the logic circuit. A further explanation of the signals along each circuit leg and eventually to the interface units 156 and 158 follows.

As described above, the signal from the analog Hall effect sensor 118 as it reads the passing of alternating magnetic fields when the tension roller 110 is rotating during the dispensing of tape comprises an alternating current analog signal however, the signal may also have a DC component which shifts the wave of the AC signal from its zero line. Moreover, when the tension roller 110 is not rotating, that is no tape is being dispensed, the analog Hall effect sensor 118 reads a steady magnetic field which will result in a direct current signal. It is thus necessary that this DC signal component be removed from the signal from the analog Hall effect sensor 118 not only to zero out the time varying AC signal, but also to provide a zero reading when only a DC signal is generated. The act of removing the DC component is referred to as DC blocking, which is conducted at box 160 in FIG. 9.

Figure 10:
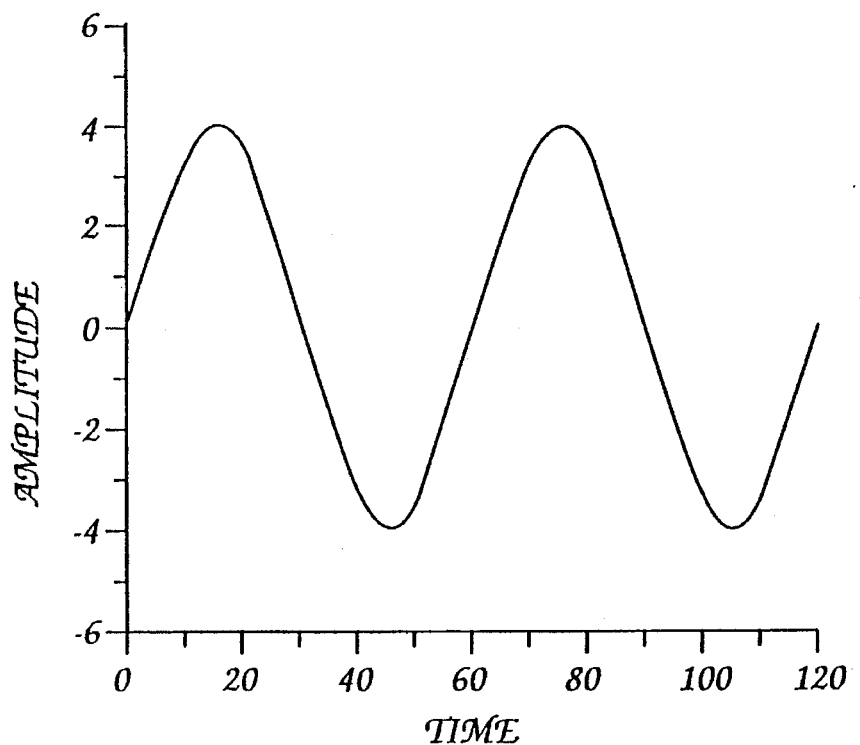
FIG. 10 is a graphical illustration of the wave form of the signal generated by the tape dispensing sensor when tape is being dispensed and when using the flexible magnetic material illustrated in FIGS. 5 and 6 with alternating successive magnetic poles.

FIG. 10 illustrates the waveform of the signal as it leaves the DC blocker 160 and as it is supplied to a peak detector with an adjustable decay rate noted by block 162. The waveform represented in FIG. 10 corresponds to that generated by the analog Hall effect sensor 118 when a flexible magnetic material layer is used in the manner illustrated in FIGS. 5 and 6 with alternating poles.

It is noted that the waveforms illustrated in FIGS. 10–13 show specific examples of signal amplitude changes over time. However, amplitude depends on the magnetic strength of each pole and the distance between the sensor the poles. Moreover, the period depends on the spacing of the magnet poles and line speed.

Figure 11:
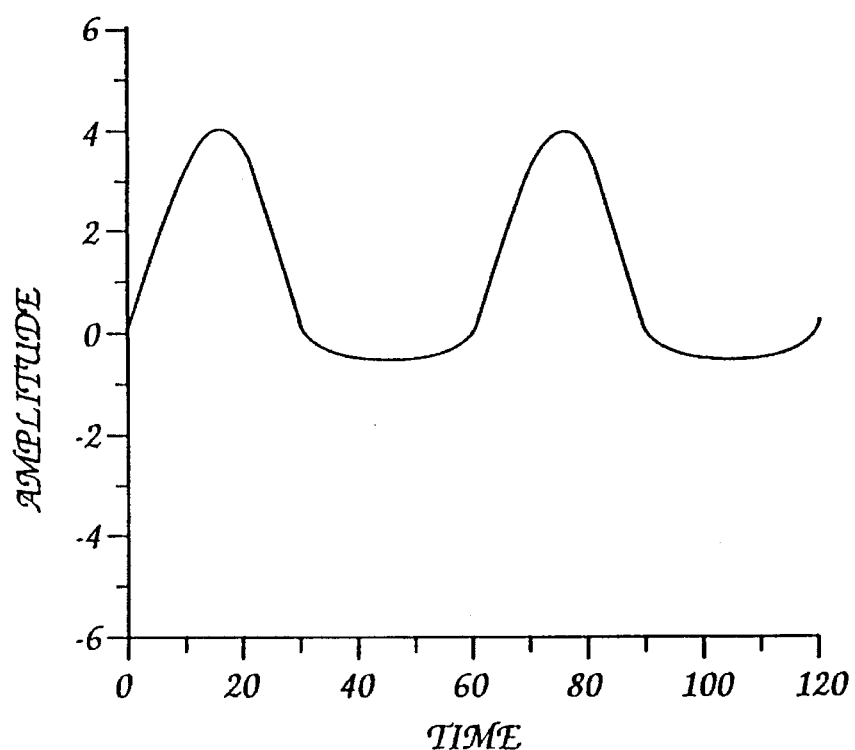
FIG. 11 is a graphical illustration of the waveform of the signal generated by the tape dispensing sensor when tape is being dispensed and when using the arrangement for the magnetic poles as shown in FIG. 7 and 8 with each successive magnet of the same polarity.
Figure 12:
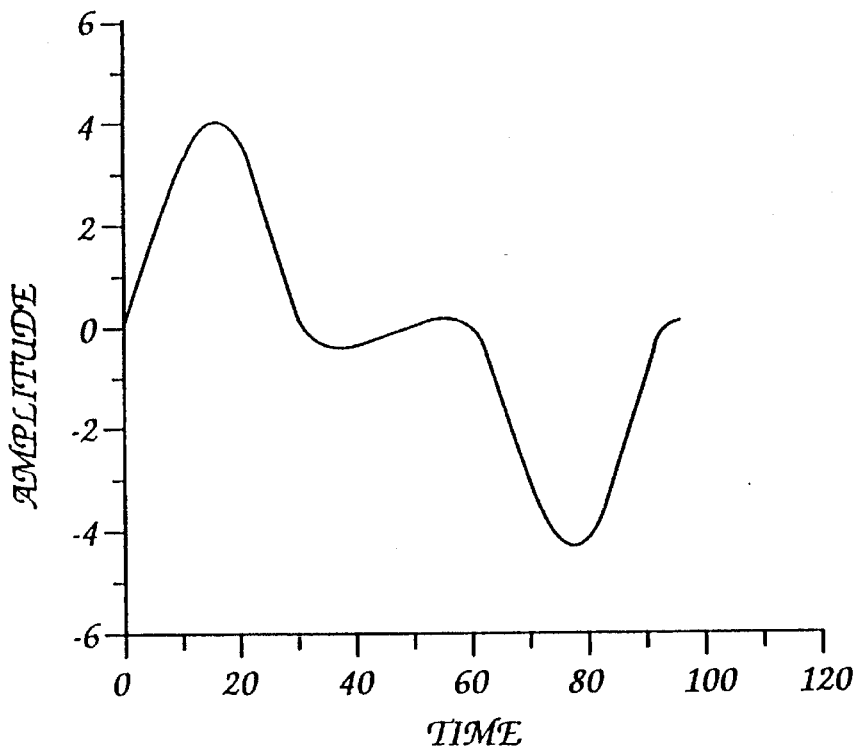
FIG. 12 is a graphical illustration of the wave form of the signal generated by the tape dispensing sensor when tape is being dispensed and when using the arrangement for the magnets as shown in FIGS. 7 and 8, but with each successive magnet at opposite polarity.

If the manner of providing the magnetic poles is as illustrated in FIGS. 7 and 8, wherein a plurality of distinct magnets are potted along the circumference of the hub portion of the tension roller 110, a different waveform results. Specifically, if the subsequent poles are of the same polarity, the waveform is as illustrated in FIG. 11. That is, with peaks substantially only in the positive direction, or only in the negative direction if the polarities were all reversed. If the magnets are arranged with alternating polarities, the generated signal is represented by the waveform illustrated in FIG. 12. In this case, peaks of positive and negative amplitude result, but the wave is skewed from the generally sinusoidal wave of FIG. 10 related to the flexible magnetic material.

Figure 13:
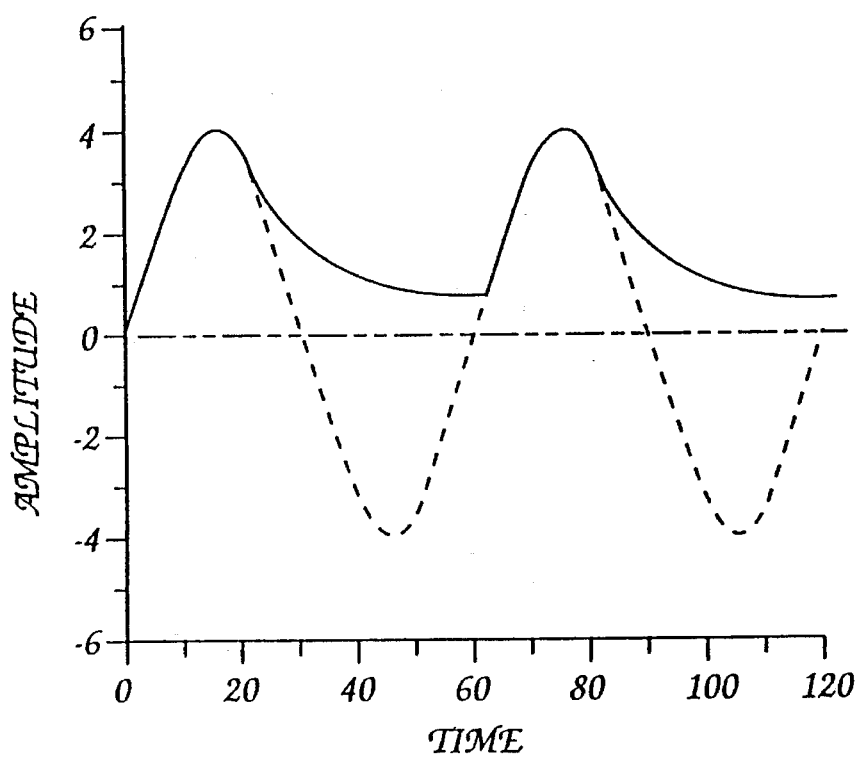
FIG. 13 is a graphical illustration showing the wave form of the signal of FIG. 10 after the signal is modified by a peak detector circuit with an adjustable decay rate.

The object of the peak detector 162 is to look at only those peaks on one side of the zero amplitude line of the alternating waveform. However, since only the peaks on one side of the zero line are detected, preferably on the positive side, it is desirable to stretch each pulse by using an adjustable decay rate circuit in conjunction with the peak detection circuit. The result of the modification of the signal of FIG. 10 so as to detect only the positive peaks, and to stretch each pulse into one another is illustrated in FIG. 13. It is understood that the curve from each peak of each pulse to the up slope of the subsequent pulse can be varied by changing the decay rate of the pulse in question. The decay rate is determined by the value of the capacitor which is used to cause the slower decay rate and thus the stretched pulse waveform of FIG. 13.

The signal from the peak detector with the adjustable decay rate is fed to a signal comparator 164 which compares the time varying signal to a reference threshold voltage. The reference voltage is constant over time and is preferably chosen so that the positive peaks, as stretched by the peak detector with adjustable decay rate, lie above the reference value during normal tape dispensing operation. That is, the stretched waveform should not cross the reference line during normal operation. The time varying signal could, however, dip below the reference voltage any number of times provided that the time below the reference voltage does not exceed a lock out time, as will be described below. In any case, each time the time varying signal dips below the reference voltage, the comparator output switches from a high signal to a low signal. When the time varying signal again crosses to go above the line of the reference voltage, the comparator output signal changes back from low to high. In other words, the comparison of the stretched time varying signal to the reference voltage produces an output signal from the comparator that is a digital signal indicating rotation or lack of rotation of the tension roller 110 as sensed by the analog Hall effect sensor 118.

The digital Hall effect sensor 134 is positioned to sense when magnet 138 is positioned directly in front of it. The signal from the digital Hall effect sensor 134 is simply a digital time varying signal indicating simply when a box is present and when it is not. Again, the magnet 138 is moved away from and out of sensing range of the digital Hall effect sensor 134 when a box is present.

The signal from the digital Hall effect sensor 134 is fed to a level shifter 166, the purpose of which is to simply shift the voltage of the signal from the digital Hall effect sensor 134 to the logic voltage. Typically, the digital Hall effect sensor 134 would use and provide a signal at a voltage different than the logic voltage; however, this may not also be the case. If they are the same, the level shift would not be required.

The signal from the level shift is then fed to an exclusive OR gate. At the same time, the digital signal of rotation from the signal comparator 164 is fed to the same exclusive OR gate 168. The digital signal from the signal comparator 164 not only identifies tape dispensing, that is during rotation of the tension roller 110, but also provides information which may result in potential errors. Specifically, a low signal is provided from the signal comparator 164 during times when the tension roller 110 is not rotating and during those instances when the signal may dip below the reference voltage during tape dispensing.

The object of the exclusive OR gate 168 is to identify every occurrence when either tape is being dispensed without a box being present or a box is present and tape is not being dispensed. It is the further object of the exclusive OR gate to provide a digital output signal which is high for every occurrence just described or to provide a low signal when either tape is not being dispensed and no box is sensed as present or tape is being dispensed and a box is sensed as present. In other words, the output from the exclusive OR gate is a true indication of all potential errors.

One specific potential error which is likely to occur is that which represents the coincidence time between the beginning of the rotation of the tension roller 110 indicating tape dispensing and the movement of the cutting frame 92 and thus the magnet 138 to indicate box presence. The coincidence time, which can be determined empirically, must be less than the lock out time, described below, and in fact is a part of what determines the value of the lock out time.

Again, only potential errors are identified at this point because they must exceed the lock out time which eliminates potential errors that are shorter in duration than the lock out time. The specific lock out time is chosen so that inadvertent error signals are ignored, such as may result inadvertently by the tension roller being bumped or by the analog Hall effect sensor 118 picking up an extraneous signal.

The digital signal of all potential errors from the exclusive OR gate is fed to a retriggerable one-shot and noise lock out circuit 170, which defines the lock out time and compares each potential error to the lock out time. Moreover, if the potential error condition has a duration longer than the lock out time, a high signal is outputted from the retriggerable one-shot and noise lock out circuit 170. In other words, an error situation is signalled and a latch circuit 172 is triggered. The object of the latch circuit 172 which activates the remainder of the circuit indicating an error condition. If the potential error has a shorter duration than the lock out time, no signal is provided from the error trigger and noise lock out circuit, and thus the latch 172 remains inactivated. In other words, the potential error is ignored. Again, these potential errors occur from the coincidence time of start up, or when either of the mechanisms are bumped or otherwise inadvertently affected. The lock out time is determined empirically by what time is necessary to ignore false error signals and to indicate a true error condition. Typically, the lock out time is between 100–225 milliseconds, but it depends largely on line speeds, box sizes and box mass.

At this point, it is noted that many other circuits could be utilized for providing a similar signal of error condition, so long as an exclusive OR logic step is utilized in accordance with the present invention to identify such an error condition when either tape is dispensed or a box is present when the other is not. For example, a digital Hall effect sensor could be easily used instead of the analog Hall effect sensor 118, provided however that it would be necessary to include a level shifter and a retriggerable one-shot circuit. Moreover, even with the use of the analog Hall effect sensor 118, other techniques could be utilized for peak detection and signal comparison.

Under an identified error condition, the latch circuit 172 sends an error condition signal which is received directly by the interface unit 156, discussed above. When the signal is received by the interface unit 156, a switch, preferably a solid state switch, is thrown for disconnecting the load, typically the box sealing machine, from its power source. The benefit of the interface unit 156, is that it has a low voltage side and a high voltage side, with the low voltage side connected with the logic circuit and the high voltage side connected to the load. As shown schematically in the FIG. 1, the switch within the interface unit 156 can be used to break power directly to the box sealing machine 10, or may be instead used to break an auxiliary piece of machinery, such as the exit conveyor 18.

The signal from the latch circuit 172 is also transmitted to both a post indicating light circuit 174 and to a NAND gate 176. The NAND gate 176 and the post indicating light circuit 174 are both further connected to a NOR gate 178 which is in turn connected with the second interface unit 158 of the warning light. Again, the interface unit 158 has a low voltage side and a high voltage side, the low voltage side connected to the circuit and controlling the high voltage side which is the AC line power to the warning light 44.

The optical sensor 140, when it senses that the tape is below a certain point and is running low, sends a signal through a level shifter 180, for the same reasons as level shifter 166 discussed above, and then to another post indicating light circuit 182. The post indicating light circuit 182 is different from the post indicating light circuit 174 so that a different signal can be provided to the second interface unit 158 for controlling the warning light 44 differently depending whether an actual error condition exists, or a low tape supply situation exists. In other words, the warning light preferably shows a different flashing pattern or the like for the low tape situation versus a error condition situation.

To do this, the controlled signal leaving the post indicating light circuit 182 is transmitted to the NAND gate 176 along with the latch signal if an error condition exists. The NAND gate 176 receives the signal from both sources, and if both are transmitting a signal, then the NAND gate 176 produces no signal. In other words, if a signal is provided from the post indicating light circuit 182, indicating a low tape situation, and if an error situation is indicated from the latch circuit 172, the error condition signal will take priority. In this case, the signal from the post indicating light circuit 174 will be transmitted through the NOR gate 178. On the other hand, if no signal is provided from the latch circuit 172 and thus the post indicating light circuit 174, and a signal is provided from the post indicating light circuit 182, indicating a low tape situation, the NAND gate 176 and the NOR gate 178 will transmit the signal from the post indicating light circuit 182 to the second interface unit 158 for controlling the warning light 44. Preferably, both of the post indicating light circuits 174 and 182 provide an oscillating light control signal which are different from one another for situation identification purposes.

Lastly, the circuit includes a power up reset circuit 184 which is connected to the latch circuit 172. The purpose of the power up reset circuit is that shortly after the machine is initially turned on, and the sensors system 12 is energized, the power up reset circuit sends a signal to the latch circuit 172 to clear any positive latch signal from the latch circuit 172. This simply resets the circuit and clears any potential error conditions which may be inadvertently detected during the machine and sensor system start up.

A complete control circuit for the sensing system of one taping head has now been fully described. It is, however, also a specific object of the present invention to provide such a control circuit for more than one such taping head. Typical box sealing machines include two such taping heads. In order to accommodate a second tape head, another identical circuit is provided for the other taping head, and it is inputted into the described circuit illustrated in FIG. 9 at yet another OR gate 186, which is located after the latch circuit 172 of the one described circuit shown in FIG. 9, but before any junctions of the line from the latch circuit 172. Thus, if an error condition is detected by either of the circuits corresponding to either of the taping heads, a positive error condition signal from either of the circuits would be transmitted to the interface unit 156, the post indicating light circuit 174 and the NAND gate 176.

Figure 16A:
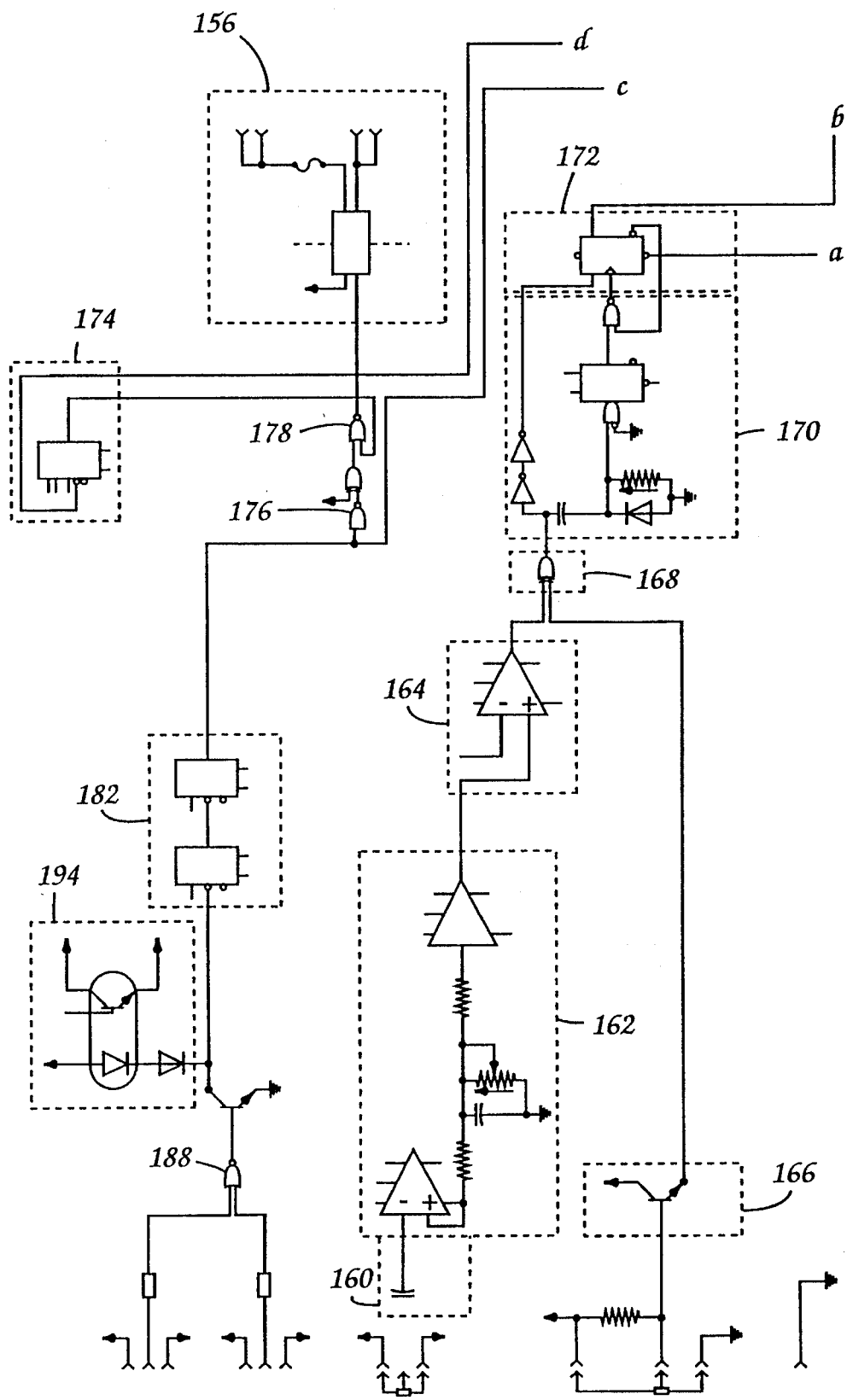
FIGS. 16A–C schematically illustrate an electrical circuit with the circuits for each block diagram function blocked for sensing and determining the existence of error conditions of a box sealing machine having an upper and a lower taping head in accordance with the present invention.
Figure 16B:
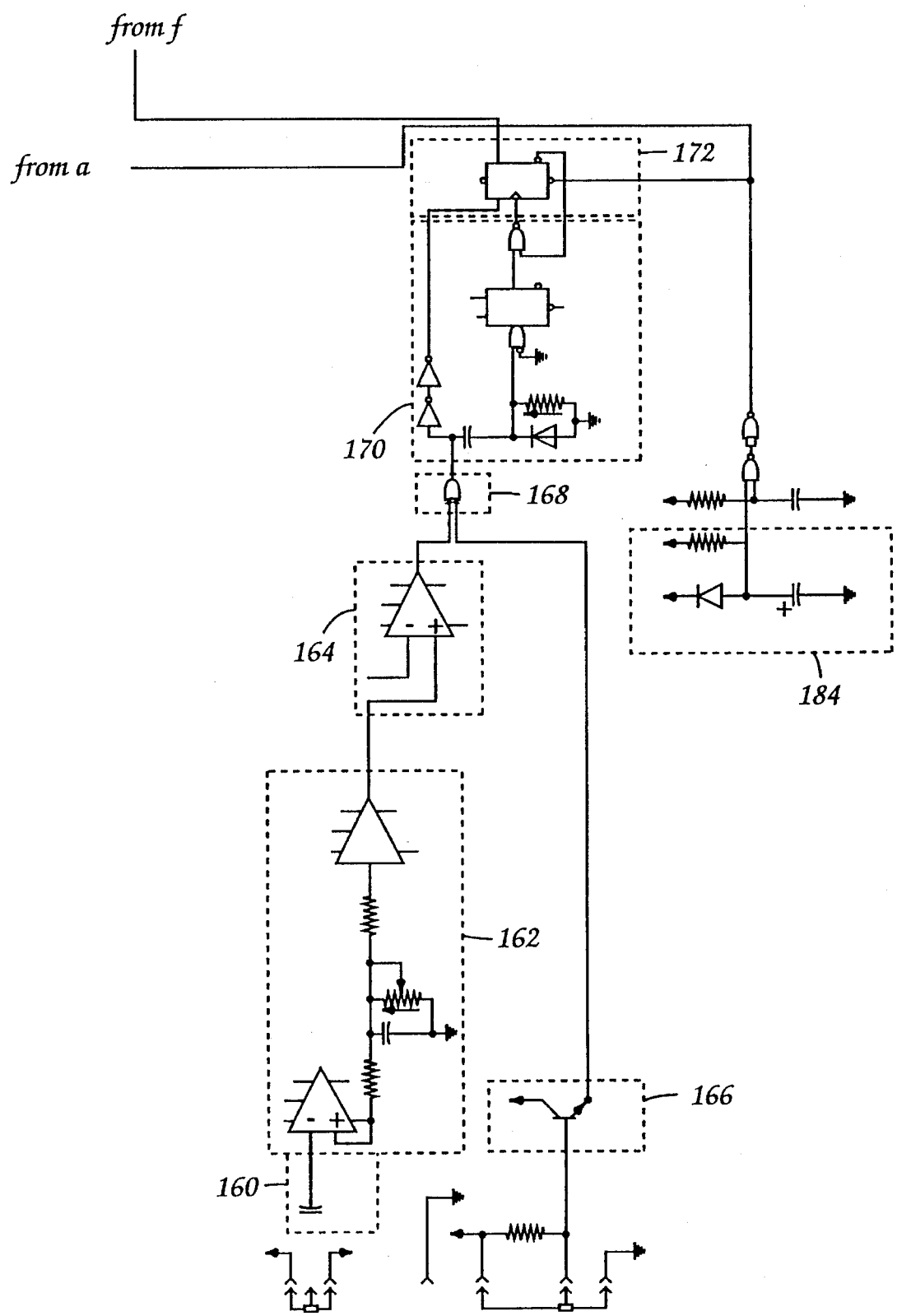
Figure 16C:
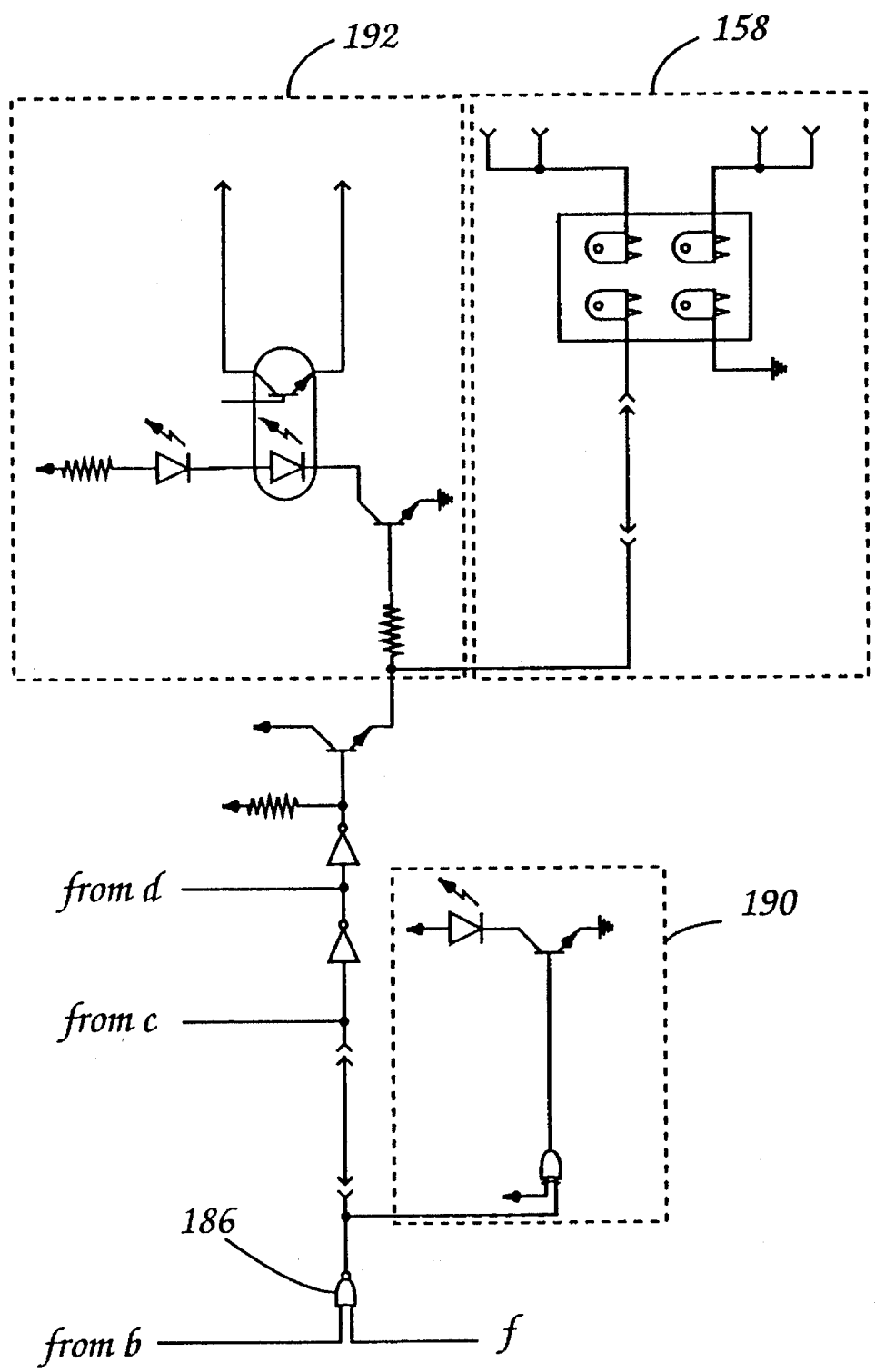

With reference now to FIG. 16, the circuits responsible corresponding to the above described block diagram of FIG. 9 are illustrated. Moreover, the circuit is of a system including an upper taping head and a lower taping head including upper and lower analog Hall input sensors, upper and lower digital Hall effect sensors, and upper and lower tape optical sensors. The circuit for the upper taping head includes the exclusive OR gate for determining potential error conditions, and an error trigger and noise lock out circuit and latch for determining and indicating actual error conditions. The OR gate 186 is illustrated connecting the upper and lower sensor circuits of the analog and digital Hall effect sensors for controlling the interface circuits for the box sealing machine 10 as well as the warning light 44. The upper and lower tape optical sensors are tied together at yet another OR gate 188 before the post indicating light circuit 182. Of additional note within the circuit diagram of FIG. 16, a system fail circuit 190 is provided after the OR gate 186 to light a panel light 191 (shown in FIG. 1) on the control box 46 indicating an error condition. A user interface circuit 192 is also preferably provided so that the error signal which results in a load shut down can also be interfaced with other user control systems or the like, such as a programmable logic controller, as schematically illustrated in FIG. 1 at 62 connected by an output line 60. Similarly, a low tape user interface circuit 194 is also preferably provided between the OR gate 188 and the post indicating light circuit 182 for user interface.

FIGS. 14 and 15 illustrate wave charts corresponding to the operating conditions of a box sealing machine as sensed by the sensor system in accordance with the present invention including potential error and actual error conditions. Each waveform indicates signal change over time with the top three waves showing an analog signal with the bottom four waves showing digital signals all corresponding in time vertically.

As shown in FIG. 14, the first sensed signal change is that of the box presence sensor which shows a change from low to high indicating such box presence. Very shortly thereafter, within the coincidence time, the tape dispensing is sensed by the rotation of the tension roller as sensed by the analog Hall effect sensor. The output of the analog Hall effect sensor is illustrated by the rotation waveform. The DC blocked waveform is similar to the rotation waveform except that the DC components have been removed, and the waveform is centered on a zero line. The peak detect waveform shows the signal as each positive pulse has been detected and stretched by the adjustable decay rate circuit. Moreover, the peak detect waveform is compared with a threshold line corresponding to the reference voltage. The digital tape signal is taken from the peak detect waveform and is shown high for the time that the threshold line is below the peak detected and stretched pulses. Referring back to the DC blocked waveform, a spacial variation is noted between subsequent pulses which is slightly larger than the others and which has inadvertently occurred due to any extraneous circumstance. On the peak detect waveform, that portion of the signal is shown to fall below the threshold line for a short time. The tape digital waveform shows this as a brief low signal at point 196.

Continuing through time from the left of the wave chart to the right, the next sensed change is the leaving of the box from the corresponding taping head sensed by the digital Hall effect sensor. Shortly thereafter, tape dispensing also ceases. Again, the difference between the ending points of each should be within the coincidence time between the two. Then, a period of no tape dispensing and of no box presence is sensed until yet another box enters and is sensed by the digital Hall effect sensor again followed within the coincidence time by the start of tape dispensing. However, at a point when the box is still sensed as present, tape dispensing has ceased. Such could occur by a tape run out situation, or a tape breakage situation. In any case, the tape digital waveform indicates the lack of tape dispensing when the last sensed positive pulse falls below the threshold line. From that point on, the tape dispensing is sensed as stopped.

Referring now to the exclusive OR wave one, the signal line changes from low to high corresponding to a first coincidence time 198, a potential error condition 200, a second coincidence time 202, a third coincidence time 204 and another potential error 206. Each of the coincidence time signals and the potential error signals 198–206 are compared to the lock out time within the error trigger and noise lock out circuit 170, discussed above. Again, the lock out time is chosen so as to ignore the coincidence time and inadvertent errors. The digitally represented error waveform indicates that each of the coincidence times 198, 202 and 204, and the first potential error 200 are below the lock out time. That is, there duration is shorter than the lock out time. The potential error 206, however, is of greater duration than the lock out time. Just as soon as the lock out time is exceeded, the error signal is changed to high and the latch circuit 172 is active. Thus, the FIG. 14 wave chart represents a number of potential errors, but indicates only a tape run out or tape breakage situation.

Referring now to FIG. 15, a similar wave chart is illustrated for potential error conditions. Beginning from the left of the figure, the same potential conditions 198, 200 and 202 as in FIG. 14 are illustrated. However, during the period between box sensing and tape dispensing operations, a peak is shown sensed by the analog Hall effect sensor indicating a bump of the tension roller. In other words, the tape waveform shows a brief inadvertent high signal while the box signal remains low, which translates into a potential error 208 on the exclusive OR waveform.

After yet another coincidence time potential error 210 is noted, the analog Hall effect sensor continues to sense tape dispensing after the digital Hall effect sensor detects that the box has left. This shows up as a potential error on the exclusive OR waveform at 212. When the lock out time is exceeded as result of the tapes continued dispensing after the box is no longer detected, an error signal is generated. Again, the error signal activates the latch circuit 172 which results in appropriate machine stoppage and warning indication. In this case, the box moved from the taping head while the tape is still being dispensed. In other words, there was a failure in the cutting of the tape and the box continued to pull tape from the taping head.

As can be seen, the sensor system 12 in accordance with the present invention provides a very quick response to error conditions that may occur by box sealing machines provided with one or more taping heads. Again, it is understood that many other circuits could be utilized within the subject control system for detecting error conditions. For example, the sensors could be connected to a microprocessor unit which would include the necessary logic to identify and determine error conditions. Furthermore, many different types of sensors can be used other than the Hall effect sensors used by the specifically described system.

It is also understood, that the sensor system in accordance with the present invention could be comprised of valves and a pneumatic or hydraulic control system. It is, however, a specific object of the sensor system of the present invention to identify tape breakage and run out situations and such other errors as may occur including the failure for the tape to be cut.

We claim:

1. A sensor system for use with a taping head for applying adhesive tape to an object as the object is moved relative to the taping head that includes a tape guide path defined through the taping head and an element which moves in reaction to the object, said sensor system comprising:

a tape dispensing sensor to be positioned along the tape guide path of a taping head for determining whether tape is being dispensed from the taping head and for providing a positive response if tape is being dispensed;

an object presence sensor to be positioned on the taping head for detecting movement of an object reacting element of the taping head and determining whether an object is present for taping and for providing a positive response if an object is present;

a control system operatively connected to said tape dispensing sensor and said object presence sensor for determining a potential error condition if only one of said tape dispensing sensor and said object presence sensor provides a positive response.

2. The sensor system of claim 1, wherein said control system further includes a means for comparing a time period of each potential error to a lock out time period and for providing a signal of an actual error condition if the period of the potential error is greater than the lock out time period.

3. The sensor system of claim 2, further including an error responsive system which is activated upon the signal of an actual error from said comparison means.

4. The sensor system of claim 3, wherein said error responsive system comprises a warning device that is activated by the signal of an actual error.

5. The sensor system of claim 4, wherein said error responsive system further comprises an interface for switching off the power to a load to prevent further objects from being moved relative to the taping head.

6. The sensor system of claim 5, further including a low tape supply sensor for providing a signal to said control system when the tape supply is below a predetermined quantity.

7. The sensor system of claim 6, wherein said control system further includes a low tape responsive system for activating a warning device upon a signal from said low tape supply sensor.

8. The sensor system of claim 7, wherein said low tape responsive system activates the same warning device as the warning device that is activated by the signal of an actual error, but in a different functional mode, and said control system further includes a decision means for giving priority to the activation of the warning device in response to an actual error.

9. A taping head and sensor system for use in a box taping machine for applying adhesive tape to a box as the box is moved relative to the taping head, said taping head including a tape guide path means defined through the taping head and a box reacting element that is moved in response to the box being moved relative to said taping head, said sensor system comprising:

a tape dispensing sensor positioned along the tape guide path of said taping head for determining whether tape is being dispensed from the taping head and for providing a positive response if tape is being dispensed;

an object presence sensor positioned on said taping head for detecting movement of the box reacting element and determining whether a box is present for taping and for providing a positive response if a box is present; and a control system operatively connected to said tape dispensing sensor and said object presence sensor for determining a potential error condition if only one of said tape dispensing sensor and said box presence sensor provides a positive response.

10. The taping head and sensor system of claim 9, further including a tension roller mounted on a frame of said taping head which is rotated by the tape when it is dispensed from said taping head and wherein said tape dispensing sensor detects rotation of said tension roller.

11. The taping head and sensor system of claim 10, wherein said control system further includes a means for comparing a time period of each potential error to a lock out time period and for providing a signal of an actual error condition if the period of the potential error is greater than the lock out time period.

12. The taping head and sensor system of claim 11, further including an error responsive system which is activated upon the signal of an actual error from said comparison means.

13. The taping head and sensor system of claim 12, wherein said error responsive system comprises a warning device that is activated by the signal of an actual error.

14. The taping head and sensor system of claim 13, wherein said error responsive system further comprises an interface for switching off the power to a load to prevent further objects from being moved relative to said taping head.

15. The taping head and sensor system of claim 14, further including a low tape supply sensor for providing a signal to said control system when the tape supply is below a predetermined quantity.

16. The taping head and sensor system of claim 15, wherein said control system further includes a low tape responsive system for activating a warning device upon a signal from said low tape supply sensor.

17. The taping head and sensor system of claim 16, wherein said low tape responsive system activates the same warning device as the warning device that is activated by the signal of an actual error, but in a different functional mode, and said control system further includes a decision means for giving priority to the activation of the warning device in response to an actual error.

* * * * *